US011828223B2

(12) United States Patent
Briley et al.

(10) Patent No.: US 11,828,223 B2
(45) Date of Patent: Nov. 28, 2023

(54) VARIABLE JET PUMP

(71) Applicant: Honeywell International Inc., Charlotte, NC (US)

(72) Inventors: Ara Briley, Chandler, AZ (US); Gary Kumagai, Walnut, CA (US); Micah S. Abel, Chandler, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/333,225

(22) Filed: May 28, 2021

(65) Prior Publication Data

US 2022/0381181 A1    Dec. 1, 2022

(51) Int. Cl.
| | |
|---|---|
| *F02C 6/08* | (2006.01) |
| *B64D 13/06* | (2006.01) |
| *B64D 15/02* | (2006.01) |
| *F02C 3/32* | (2006.01) |
| *F02C 9/18* | (2006.01) |
| *F04F 5/48* | (2006.01) |

(52) U.S. Cl.
CPC ............... *F02C 6/08* (2013.01); *B64D 13/06* (2013.01); *B64D 15/02* (2013.01); *F02C 3/32* (2013.01); *F02C 9/18* (2013.01); *F04F 5/48* (2013.01); *B64D 2013/0618* (2013.01); *B64D 2013/0666* (2013.01)

(58) Field of Classification Search
CPC .... B64D 2013/0603; B64D 2013/0607; F02C 3/32; F02C 6/08; F02C 9/18
See application file for complete search history.

(56) References Cited

U.S. PATENT DOCUMENTS

| | | | |
|---|---|---|---|
| 1,421,843 | A | 7/1922 | Schmidt |
| 3,367,256 | A | 2/1968 | Townsend et al. |
| 3,441,045 | A | 4/1969 | Malone |
| 4,285,466 | A | 8/1981 | Linscheid et al. |

(Continued)

FOREIGN PATENT DOCUMENTS

| | | |
|---|---|---|
| EP | 1923553 A2 | 5/2008 |
| EP | 3219956 A2 | 9/2017 |

(Continued)

OTHER PUBLICATIONS

Extended Search Report from counterpart European Application No. 22173756.2 dated Oct. 12, 2022, 9 pp.

(Continued)

*Primary Examiner* — Thuyhang N Nguyen
(74) *Attorney, Agent, or Firm* — Shumaker & Sieffert, P.A.

(57) ABSTRACT

A bleed system including control circuitry and a variable jet pump. The control circuitry is configured to receive a signal indicative of a fluid parameter in the bleed system and cause the jet pump to alter a mixing ratio of a higher pressure gas and a lower pressure gas based on the signal. The jet pump is configured to combine the lower pressure gas and the higher pressure gas in the mixing ratio to generate a mixed gas. The jet pump is configured to supply the mixed gas to one or more gas loads in the bleed system. In examples, the control circuitry is configured to establish a system setpoint for the fluid parameter based on an operating status of the one or more gas loads.

20 Claims, 4 Drawing Sheets

(56) References Cited

U.S. PATENT DOCUMENTS

| | | | |
|---|---|---|---|
| 6,701,715 B2* | 3/2004 | Anderson | F02C 3/32 |
| | | | 417/189 |
| 7,306,644 B2 | 12/2007 | Leigh et al. | |
| 8,099,973 B2 | 1/2012 | Sampson et al. | |
| 8,672,644 B2 | 3/2014 | Kidd et al. | |
| 8,985,966 B2 | 3/2015 | Sampson et al. | |
| 9,260,974 B2* | 2/2016 | Hasting | F01D 11/20 |
| 11,117,669 B2* | 9/2021 | Fletcher | F02C 9/18 |
| 2003/0205049 A1 | 11/2003 | Anderson et al. | |
| 2007/0125092 A1 | 6/2007 | Wolfe et al. | |
| 2008/0118371 A1* | 5/2008 | Vasquez | F04D 13/12 |
| | | | 239/533.5 |
| 2008/0247881 A1 | 10/2008 | Sampson et al. | |
| 2012/0117977 A1* | 5/2012 | Childers | F02C 9/18 |
| | | | 60/785 |
| 2013/0192250 A1 | 8/2013 | Glahn et al. | |
| 2014/0255218 A1 | 9/2014 | Sarshar et al. | |
| 2015/0059350 A1* | 3/2015 | Kolvick | G05B 15/02 |
| | | | 60/39.52 |
| 2016/0222986 A1 | 8/2016 | Mason et al. | |
| 2017/0218852 A1* | 8/2017 | Klosinski | F02C 9/18 |
| 2018/0312262 A1 | 11/2018 | Wiegers et al. | |
| 2019/0153963 A1 | 5/2019 | Kitaguchi | |
| 2022/0381181 A1 | 12/2022 | Briley et al. | |

FOREIGN PATENT DOCUMENTS

| | | |
|---|---|---|
| JP | 4882471 B2 | 2/2012 |
| WO | 2022122247 A1 | 6/2022 |

OTHER PUBLICATIONS

Response to Extended Search Report dated Oct. 12, 2022, from counterpart European Application No. 22173756.2 filed Dec. 8, 2022, 48 pp.

* cited by examiner

VARIABLE JET PUMP

TECHNICAL FIELD

The present disclosure relates to a bleed system, such as a bleed air system on-board an aircraft.

BACKGROUND

Bleed systems are used to extract pressurized air from turbine engines for various uses, including supplying auxiliary power, cooling air, and other air loads served by the system. For example, aircraft bleed systems may extract pressurized air from a turbine engine supplying thrust to the aircraft to provide air to various air loads and air-use systems, such as to an environmental control system configured to pressurize a cabin of the aircraft, an air drive unit configured to pressurize hydraulics, an anti-icing system configured to remove and/or limit ice on a wing of the aircraft, an inert gas generating system configured to pressurize a fuel tank of the aircraft, and other air loads The bleed system provides the bleed air at a pressure, temperature, and mass flow sufficient to ensure an adequate bleed air supply to the served loads.

SUMMARY

The present disclosure describes a bleed system (also referred to herein as a bleed air system) that includes control circuitry and a variable jet pump. The jet pump is configured to receive a relatively low pressure gas ("lower pressure gas") and a higher pressure gas from a turbine engine. In some examples, the lower pressure gas and the higher pressure gas may be air and the turbine engine may be an aircraft turbine configured to provide thrust to an aircraft. The jet pump is configured to combine the lower pressure gas and the higher pressure gas in a mixing ratio to generate a mixed gas at an intermediate pressure and temperature, which may be supplied to one or more gas loads served by the bleed system. The control circuitry is configured to receive a signal indicative of a fluid parameter (e.g., a pressure, a temperature, and/or a flow rate) in the bleed system and cause the jet pump to alter the mixing ratio based on the signal. For example, the control circuitry may compare the indicated fluid parameter to a system setpoint and cause the jet pump to alter the mixing ratio based on the comparison.

In some examples, the control circuitry is configured to establish the system setpoint for the fluid parameter based on an operating status of the one or more gas loads served by the bleed system, such that the jet pump extracts an amount of the higher pressure gas and the lower pressure gas from the turbine engine based on the combined gas demand of operating gas loads.

In examples, a system comprises: a jet pump configured to receive a lower pressure gas from a lower pressure stage of a turbine engine and receive a higher pressure gas from a higher pressure stage of the turbine engine, wherein the jet pump is configured to combine the lower pressure gas and the higher pressure gas to produce a mixed gas, and wherein the jet pump is configured alter a mixing ratio of the higher pressure gas to the lower pressure gas combined when the jet pump produces the mixed gas; and control circuitry configured to receive a signal indicative of a fluid parameter of the mixed gas, wherein the control circuitry is configured to cause the jet pump to alter the mixing ratio based on the signal.

In examples, a system comprises: a jet pump configured to receive a lower pressure gas from a lower pressure stage of a turbine engine and receive a higher pressure gas from a higher pressure stage of the turbine engine; wherein the jet pump is configured to combine the lower pressure gas and the higher pressure gas to produce a mixed gas, wherein the jet pump is configured alter a mixing ratio of the higher pressure gas to the lower pressure gas combined when the jet pump produces the mixed gas, and wherein the jet pump is configured to issue a flow of the mixed gas in a downstream direction to a load configured to receive the mixed gas; and control circuitry, wherein: the control circuitry is configured to receive a signal indicative of a fluid parameter of the mixed gas upstream of the load, the control circuitry is configured to determine a setpoint for the fluid parameter, and the control circuitry is configured to cause the jet pump to alter the mixing ratio based on a comparison of the signal and the setpoint.

In examples, a method comprises: receiving, by control circuitry, a signal indicative of a fluid parameter of a mixed gas in a distribution system, wherein the mixed gas is generated by a jet pump configured to mix a lower pressure gas and a higher pressure gas to produce the mixed gas; and altering, by the control circuitry, a mixing ratio of the higher pressure gas to the lower pressure gas combined by the jet pump to produce the mixed gas based on the signal received.

The details of one or more examples are set forth in the accompanying drawings and the description below. Other features, objects, and advantages will be apparent from the description and drawings, and from the claims.

DETAILED DESCRIPTION

Turbine engines (e.g., gas turbines) generally intake and compress a gas such as air in a compressor section prior using the gas to combust fuel for engine thrust. The compressor section generally receives the gas (e.g., air) through an intake and compresses the gas using a series of compressor stages. The compressor stages progressively increase the gas pressure, in order to provide the gas in sufficient quantity and pressure to a combustion section. The combustion section mixes the gas and a fuel and causes a combustion. The combustion generates rapidly expanding combustion gases which may be utilized to rotate a turbine shaft and/or produce engine thrust. In aircraft engines, in addition to causing some amount of shaft rotation to drive the compressor section, the combustion gases are ejected through an exhaust section to generate engine thrust for the aircraft.

In some cases, a portion of the compressed gas is diverted from the compressor section of the turbine engine as a bleed gas (e.g., bleed air) prior to entering the combustion section. The bleed gas may be extracted from the compressor section and provided to a bleed system configured to distribute the bleed gas to various gas loads (also referred to as air loads in some examples) operating elsewhere in the system. For example, bleed gas may be extracted from one or more compressor stages of a turbine engine during aircraft flight to support applications such as one or more of an Environmental Control System (ECS) system of a passenger cabin, wing anti-icing, air-driven motors, hydraulic pressurization, fuel tank pressurization, or other uses. The bleed system may use a network of ducts, valves, regulators, and other components to route the bleed gas from the compressor section of the turbine engine to various locations within the aircraft. The bleed system is typically configured to extract sufficient bleed gas from the turbine engine to substantially maintain the air pressure in the distribution system within a specific pressure range.

In some bleed air systems, bleed gas is extracted from multiple compressor stages of the turbine engine in order to provide sufficient gas to the one or more gas loads served. For example, the bleed system may be configured to extract a relatively low pressure air ("lower pressure air") from an initial compressor stage and a relatively high pressure air ("higher pressure air") from a subsequent compressor stage. The lower pressure air has a lower pressure than the higher pressure air. For example, the lower pressure gas may be intermediate pressure air ("IP air") from an intermediate compressor stage of a turbine engine and the higher pressure gas may be high pressure air ("HP air") from a high compressor stage of the turbine engine. The higher pressure gas extracted from the subsequent compressor stage generally has a higher pressure and temperature than the lower pressure gas air extracted from the initial compressor stage. As a non-limiting example, in the context of some aircraft, the higher pressure gas may be at about 47.63 Atmospheres (about 700 pounds per square inch (psi)) and a temperature of 1000-1400 degrees Fahrenheit (about 538-760 degrees Celsius) and the lower pressure gas may be at 500-700 degrees Fahrenheit (about 260-371 degrees Celsius).

The bleed system may be configured to mix the higher pressure gas and the lower pressure gas in order to maintain the gas supply to the operating loads. For example, in some bleed systems, when the lower pressure gas (e.g., the IP air) extracted is insufficient to meet the operating requirements of the served gas loads (e.g., at lower engine power), the bleed system may be configured to extract and mix the higher pressure gas (e.g., the HP air) with the lower pressure gas to maintain a sufficient gas supply to the gas loads.

In some examples, the bleed system is configured to adjust the relative amounts of higher pressure gas and lower pressure gas extracted by monitoring a control variable, such as a pressure and/or temperature of the mixed gas within the bleed system. The control variable may be sensed by sensors positioned at one or more specific fixed locations in the bleed system, such as a point upstream of the gas loads being served by the bleed system. The control circuitry of the bleed system may adjust the relative amounts of higher pressure gas and lower pressure gas extracted based on a comparison between the monitored control variable and a system setpoint. In this manner, the bleed system may use the control variable as a proxy for system demand. However, in bleed systems serving multiple gas loads with individual mixed gas requirements, a single and/or unvarying system setpoint for the monitored control variable may be inadequate to accurately reflect the system demand as the individual gas loads are transiently operated (e.g., are turned on or off, or experience increased or decreased output load). This may result in extracting more higher pressure gas from the turbine engine than might be required based on the actual demands of the individual loads. This excess use of the higher pressure gas may detract from the achievable fuel efficiency of the turbine engine. That is, because the bleed air is generally extracted after compression by the turbine engine, bleed air use may result in additional fuel consumption by the turbine engine. Hence, the fuel efficiency of the turbine engine may be impacted by the bleed system.

The bleed system disclosed herein is configured to adjust an amount of the higher pressure gas and the lower pressure gas extracted by at least comparing a fluid parameter (e.g., a pressure, a temperature, and/or flow rate) within the bleed system to a system setpoint using control circuitry. The control circuitry is configured to receive a signal indicative of the fluid parameter and compare the indicated fluid parameter to a set point. The control circuitry may be configured to establish the system setpoint based on reception of a communication signal, such that the system setpoint may be varied. The control circuitry is configured to cause a jet pump of the bleed system to alter a mixing ratio of the higher pressure gas to the lower pressure gas based on a comparison of the fluid parameter indicated and the established system setpoint. In examples, the control circuitry is configured to establish the system setpoint based on individual gas loads operating within the bleed system at a given time. Hence, the bleed system may be configured to substantially maintain the fluid parameter based on a variable system setpoint, where the variable system setpoint is determined based on the individual gas loads currently operating in the bleed system. This may reduce an amount of higher pressure gas extracted from the compressor section and limit the impact of the extraction on turbine engine efficiency.

The bleed system disclosed herein is configured to receive a lower pressure gas and a higher pressure gas from a turbine engine. The lower pressure gas may be air, such as an IP air. The higher pressure gas may be air, such as HP air. The turbine engine may be configured to intake the gas (e.g., air) through an intake and compress the gas using one or more compressor stages. The turbine engine may be configured to provide some portion of the compressed gas as the lower pressure gas and the higher pressure gas. For example, the turbine engine may be configured to provide the lower pressure gas from a lower pressure stage in a compressor section of the turbine engine (e.g., the third compressor stage) and provide the higher pressure gas from a higher pressure stage in the compressor section of the turbine engine (e.g., the seventh compressor stage). In examples, the turbine engine is configured to provide another portion of the compressed gas to a combustion chamber for use as an oxidant to enable the combustion of a fuel.

The bleed system is configured to combine the lower pressure gas and the higher pressure gas received to produce a mixed gas. The bleed system is configured to provide the mixed gas to one or more gas loads configured to receive the mixed gas. For example, when the mixed gas is air, the bleed system may be configured to provide the mixed gas to an Environmental Control System (ECS) configured to cool and/or pressurize a cabin of an aircraft. As another example, in addition to or instead of the ECS, the bleed system may be configured to provide the mixed gas to one or more air driven motors such as an Air Drive Unit (ADU) configured to pressurize hydraulics, an aircraft wing anti-icing system configured to remove and/or limit ice on an aircraft wing, an inert gas generating system configured to pressurize a fuel tank, and other gas loads. The bleed system may be configured to provide the mixed gas to any pneumatic system configured to receive a gas. The pneumatic system may be a system configured to support the operations of aircraft.

The bleed system includes a jet pump configured to receive the lower pressure gas and higher pressure gas. The jet pump is configured to mix the lower pressure gas and the higher pressure gas to produce a mixed gas. The jet pump may be configured to supply the mixed gas to a gas supply header configured to provide the gas to gas loads served by the bleed system. The jet pump may be configured to vary a mixing ratio of the higher pressure gas to the lower pressure gas when the jet pump produces the mixed gas. In examples, the jet pump is a variable nozzle jet pump. In some examples, the jet pump includes a variable nozzle configured having translating member (e.g., a needle) configured to translate relative to a nozzle body to increase or decrease a flow area defined between the translating member and the nozzle body. The jet pump may be configured to translate the translating member to increase or decrease the flow area in order to vary the mixing ratio of the higher pressure gas to the lower pressure gas combined to produce the mixed gas.

This variable nozzle jet pump may be configured to enable elimination of a jet pump bypass valve, which is typically required to reduce flow restrictions and pressure losses associated with operation at low engine throttle from the HP air source.

The control circuitry of the bleed system is configured to cause the jet pump to alter the mixing ratio of the higher pressure gas to the lower pressure gas based on a fluid parameter (e.g., a pressure, a temperature, and/or a flow rate) of the mixed gas in the bleed system. For example, in some examples, the control circuitry is configured to receive one or more signals (e.g., an electronic, optical, or other signal) indicative of the one or more fluid parameters from one or more sensors within the bleed system and cause the jet pump to alter the mixing ratio based on the signals. In examples, the control circuitry is configured to compare the fluid parameter indicated by the sensor with a system setpoint and cause the jet pump to alter the mixing ratio based on the comparison. The jet pump may be configured to cause the jet pump to alter the mixing ratio (e.g., increase or decrease the ratio of the higher pressure gas to the lower pressure gas) in order to reduce and/or eliminate a departure between the indicated fluid parameter and the set point. Thus, the bleed system may be configured to configured to substantially maintain the fluid parameter based on a variable system setpoint, potentially limiting the impact of the higher pressure gas extraction on the efficiency of a turbine engine providing the higher pressure gas. The bleed system may limit the impact of one or more loads such as an ECS, an ADU, an anti-icing system, and/or a fuel pressurizing system of the fuel consumption of a turbine engine. In examples, the bleed system may reduce a size and/or weight requirement associated with a pre-cooler ("PCL") configured to cool a gas within the bleed system.

The control circuitry can determine the system setpoint using any suitable technique. In some examples, the control circuitry determines the system setpoint by at least referencing a system setpoint stored by a memory accessible to the control circuitry. In some examples, the control circuitry is configured to receive a load signal (e.g., one or more electronic communications) and establish the set point based on the load signal, such that the system setpoint may be varied and vary over time.

In some examples, the control circuitry is configured to determine the system setpoint based on a current and/or anticipated demand for the mixed gas based on an operating status of one or more of the gas loads within the bleed system. For example, the control circuitry may be configured to receive one or more load signals indicating the operating status of the one or more gas loads and establish the system setpoint based on the load signals. The load signal may be a binary on/off signal indicating whether a specific gas load is operating or secured, a signal indicative of an amount of mixed gas the specific gas load is using or anticipated to use, or some other signal type indicating use of the mixed gas by the specific gas load. Hence, the control circuitry may be configured to establish the system setpoint based on the mixed gas demand of the operating gas loads within the bleed system, such that the jet pump adjusts the amount of the higher pressure gas extracted based on the operational needs of the currently operating gas loads.

Figure 1:
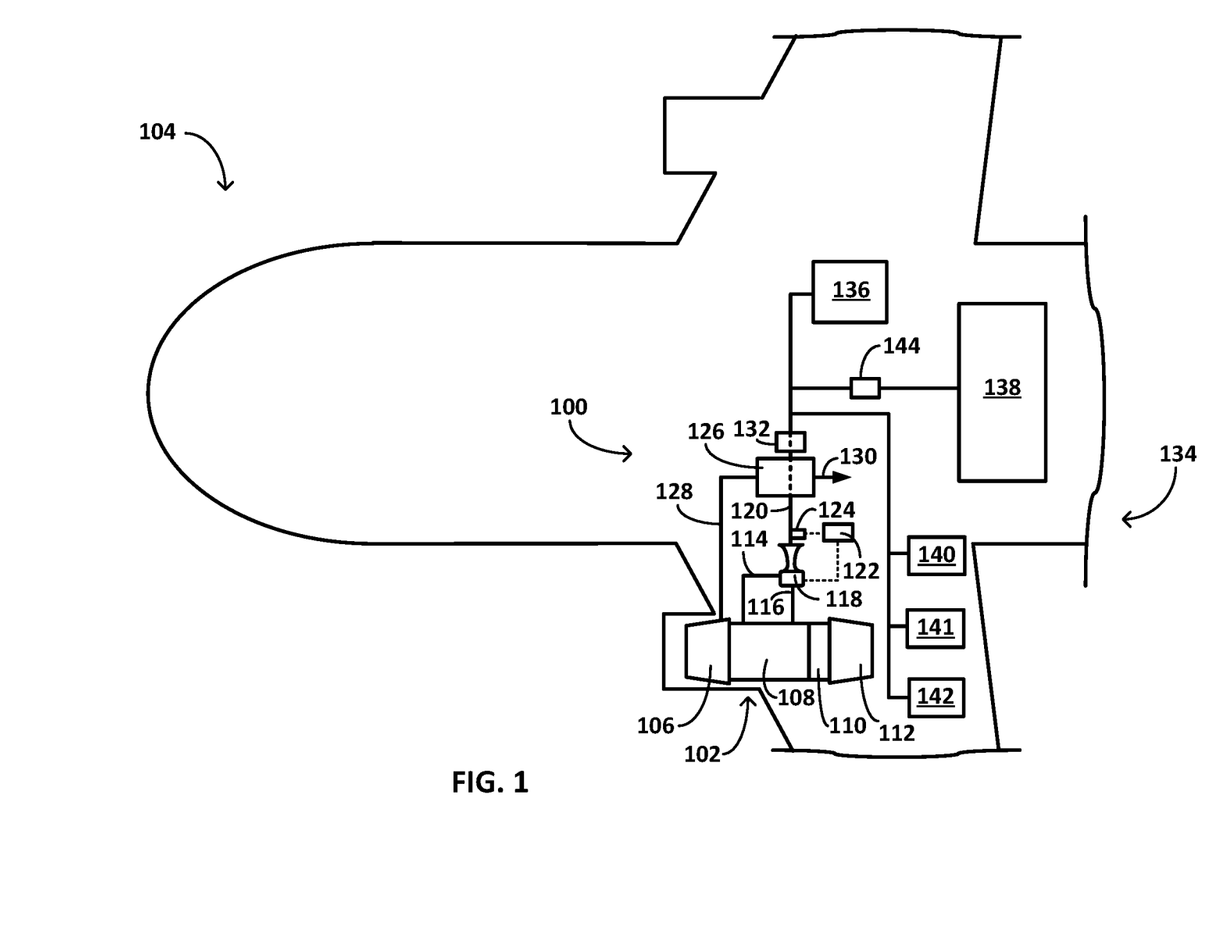
FIG. 1 is a schematic illustration of an example bleed system of an aircraft.

FIG. 1 illustrates an example bleed system 100 configured to receive a lower pressure gas and a higher pressure gas from a turbine engine 102 of an aircraft 104. While aircraft 104 is primarily referred to in the description of FIG. 1 and some of the other figures, bleed system 100 and other bleed systems described herein may be part of another vehicle or another non-vehicle system that includes gas loads configured to receive bleed air.

Turbine engine 102 includes a turbine engine fan section 106, a compressor section 108, a combustion section 110, and an exhaust section 112. Turbine engine 102 is configured to receive a gas flow (e.g., an air flow) via turbine engine fan section 106 and compress the gas in compressor section 108 using a series of compressor stages to progressively increase the gas pressure. Turbine engine 102 mixes a portion (e.g., a majority) of the compressed gas and a fuel in a combustion section 110 to cause a combustion and generate combustion gases. The combustion gases eject through an exhaust section 112 to generate engine thrust for aircraft 104. Aircraft 104 may include any number of engines such as turbine engine 102 configured to generate engine thrust on aircraft 104.

Bleed system 100 is configured to divert some amount of the compressed gas from compressor section 108 prior to the compressed gas entering combustion section 110. Bleed system 100 may be configured to extract the compressed gas from multiple compressor stages of compressor section 108 of turbine engine 102. For example, bleed system 100 may extract a lower pressure air from a lower pressure compressor stage of compressor section 108 through a conduit 114 fluidly coupled to the lower pressure compressor stage and a higher pressure air from a higher pressure compressor stage of compressor section 108 through a conduit 116 fluidly coupled to the higher pressure compressor stage. In some examples, the lower pressure gas is IP air from an intermediate compressor stage of turbine engine 102 and the higher pressure gas is HP air from a high compressor stage of turbine engine 102. In other examples, however, the lower pressure gas is air from a different compressor stage of turbine engine 102 and/or the higher pressure gas is air from a different compressor stage, but is still at a higher pressure than the lower pressure gas.

Bleed system 100 includes a jet pump 118 is configured receive the lower pressure gas via conduit 114 and the higher pressure gas via conduit 116. Jet pump 118 is configured to combine the higher pressure gas and the lower pressure gas to produce a mixed gas. Jet pump 118 is configured to combine the lower pressure gas and the higher pressure gas in a mixing ratio, where the mixing ratio reflects a ratio of the higher pressure gas to the lower pressure gas combined when jet pump 118 produces the mixed gas. Jet pump 118 is further configured to alter the mixing ratio. In examples, jet pump 118 includes a translating member configured to translate to alter the mixing ratio. For example, jet pump 118 may be a variable nozzle jet pump including a translating member (e.g., a needle) configured to translate relative to a nozzle body of jet pump 118 to increase or decrease a flow area for the higher pressure gas or the lower pressure gas. Jet pump 118 may be configured to translate the translating member to increase or decrease the flow area in order to vary the mixing ratio of the higher pressure gas to the lower pressure gas combined to produce the mixed gas.

The use of a variable nozzle jet pump such as jet pump 118 configured to alter the mixing ratio by altering a flow area of the variable nozzle may enable control of a fluid parameter (e.g., a pressure) within the bleed system over a greater range and/or in a more responsive manner than that which might be achieved using a fixed nozzle jet pump. For example, a fixed nozzle jet pump system may be more limited in the maximum or minimum values of the fluid parameter the fixed nozzle may achieve by mixing the higher pressure gas and the lower pressure gas as compared to a variable nozzle jet pump. The fixed nozzle jet pump may further be reliant on other components within the bleed system to increase or decrease a flow rate of the higher pressure gas and/or lower pressure gas to alter the mixing ratio, possibly resulting in a decreased responsiveness of the system.

Bleed system 100 includes control circuitry 122 configured to cause jet pump 118 to alter the mixing ratio. Control circuitry 122 is configured to receive a signal (e.g., an electrical signal or an optical signal) indicative of a fluid parameter of the mixed gas (e.g., a pressure, temperature, and/or flow rate) from a sensor 124 and compare the indicated fluid parameter to a system setpoint. Control circuitry 122 may be configured to receive the signal via a communication link 123. Control circuitry 122 is configured to cause jet pump 118 to alter the mixing ratio based on the comparison of the indicated fluid parameter indicated and the system setpoint. For example, if the fluid parameter indicated by sensor 124 is less than a system setpoint, then control circuitry 122 may cause jet pump 118 to alter the mixing ratio such that the fluid parameter within supply conduit 120 increases to substantially match (e.g., match or get closer to, such as within 1%-10% of) the system setpoint. If the fluid parameter indicated by sensor 124 is greater than a system setpoint, then control circuitry 122 may cause jet pump 118 to alter the mixing ratio such that the fluid parameter within supply conduit 120 decreases to substantially match the system setpoint. In examples, the system setpoint is defined by a range of values around a central setpoint value, and the fluid parameter within supply conduit 120 substantially matches the system setpoint when the fluid parameter is within the range of values. In examples, control circuitry 123 is configured to transmit a control signal to cause jet pump 118 to alter the mixing ratio via a communication link 125.

In some examples, bleed system 100 includes a pre-cooler 126 ("PCL 126") configured to exchange heat with (e.g., cool) the mixed gas issued from jet pump 118 to supply conduit 120. For example PCL 126 may be configured to cool the mixed gas from a temperature greater than about 400° F. (204° C.) to temperature less than about 380° F. (193° C.). PCL 126 may be configured to receive a gas flow via conduit 128 and may be configured to cause heat exchange between the gas flow and the mixed gas in PCL 126. In examples, conduit 128 is fluidly coupled to turbine engine fan section 106 of turbine engine 110, and bleed system 100 is configured to supply the gas flow to PCL 126 from the turbine engine fan section 106. The gas flow received via conduit 128 may be relatively low pressure air ("fan air") from turbine engine fan section 106. PCL 126 may be configured to discharge the gas flow via discharge conduit 130 following the heat exchange with the mixed gas. In examples, bleed system 100 is configured to discharge the gas flow overboard or into the engine core compartment of aircraft 104 via discharge conduit 130.

Bleed system 100 may include a filtration unit 132 configured to condition at least some portion of the mixed gas. In examples, filtration unit 132 is configured to reduce an ozone concentration within the mixed gas by, for example, converting some portion of the ozone (O3) in the mixed gas to diatomic oxygen (O2). Filtration unit 132 may be configured to remove substances such as hydrocarbons, water, and/or particulates from the mixed gas. Although illustrated in FIG. 1 located downstream of jet pump 118 and PCL 126, filtration unit 132, if present, may be located in any suitable place within bleed system 100. For example, filtration unit 132 may be located downstream of jet pump 118 and upstream of PCL 126 (e.g., between jet pump 118 and PCL 126), or elsewhere within bleed system 100.

Bleed system 100 is configured to distribute the mixed gas from supply conduit 120 to one or more gas loads 134 of aircraft 104, such as environmental control system 136 ("ECS 136"), fuel tank system 138, air drive unit 140 ("ADU 140"), and/or anti-icing system 142. ECS 136 may be configured to further condition a first portion of the mixed gas prior to utilizing the first portion to pressurize a cabin of aircraft 104. Fuel tank system 138 may be configured to utilize a second portion of the mixed gas (e.g., a nitrogen-enriched portion) to pressurize an ullage space of fuel tank system 138. Bleed system 100 may include an inert gas generation system 144 configured to reduce an oxygen concentration of the second portion prior to the second portion entering the ullage space of a fuel tank within fuel tank system 138. ADU 140 may be a gas-driven motor configured to utilize a third portion of the mixed gas to pressurize a hydraulic system of aircraft 104 to allow, for example, the operation of flaps and other control surfaces of aircraft 104. Anti-icing system 142 may be configured to utilize a fourth portion of the mixed gas to remove and/or limit ice on a wing or other portion of aircraft 104. Bleed system 100 may be configured to provide the mixed gas to a pneumatic system 141 of aircraft 104 instead of or in addition to ECS 136, fuel tank system 138, ADU 140, or anti-icing system 142. Pneumatic system 141 may be a system, device, component, or combination thereof configured to receive mixed gas from a gas source such as bleed system 100. In examples, pneumatic system 141 is a system, device, component, or combination thereof configured to support the operations of aircraft 104.

As discussed, control circuitry 122 is configured to receive a signal indicative of a fluid parameter of the mixed gas from sensor 124. The signal may be an electronic signal, an optical signal, or another signal sufficient to provide information describing the fluid parameter from sensor 124 to control circuitry 122. Sensor 124 is configured to monitor the fluid parameter of the mixed gas within supply conduit 120. Jet pump 118 is configured to produce the mixed gas by at least combining the higher pressure gas received via conduit 116 and the lower pressure gas received via conduit 114. Control circuitry 122 is configured to cause jet pump 118 to alter a mixing ratio of the higher pressure gas to the low pressure gas used to produce the mixed gas based on the signal received from sensor 124. In examples, control circuitry 122 compares the fluid parameter indicated by the signal from sensor 124 to a system setpoint, and causes jet pump 118 to alter the mixing ratio based on the comparison.

The demand for the mixed gas by gas loads 134 may impact the fluid parameter of the mixed gas within supply conduit 120. For example, when the fluid parameter is a pressure and sensor 124 is configured to indicate a pressure of the mixed gas in supply conduit 120, an increased demand for the mixed gas (e.g., an increased mass flow) to ECS 136, fuel tank system 138, ADU 140, anti-icing system 142, and/or another gas load served by bleed system 100 may cause a decrease in the pressure of the mixed gas in supply conduit 120. The decrease in pressure may cause sensor 124 to provide a signal to control circuitry 122 indicative of the reduced pressure. In response to the signal, control circuitry 122 may cause jet pump 118 to alter the mixing ratio of the higher pressure gas to the lower pressure gas to cause the pressure of the mixed gas in supply conduit 120 to increase. For example, control circuitry 122 may cause jet pump 118 to increase a flow area to increase a flow of the higher pressure gas received via conduit 116.

Similarly, a decreased demand for the mixed gas to ECS 136, fuel tank system 138, ADU 140, anti-icing system 142, and/or another gas load served by bleed system 100 may cause an increase in the pressure of the mixed gas in supply conduit 120, causing sensor 124 to provide a signal indicative of the increased pressure, such that control circuitry 122 causes jet pump 118 to alter the mixing ratio to cause the pressure of the mixed gas in supply conduit 120 to decrease. Control circuitry 122 may compare the fluid parameter indicated by the signal from sensor 124 to a system setpoint, such that control circuitry 122 causes jet pump 118 to alter the mixing ratio until jet pump 118 achieves a mixing ratio causing the fluid parameter indicated to better match (e.g., substantially match) the system setpoint.

In examples, bleed system 100 and/or gas loads 134 may be configured such that the individual demand for mixed gas from an individual gas load is satisfied by a value of the fluid parameter within supply conduit 120 different from a value of the fluid parameter required by one or more other gas loads within gas loads 134. For example, bleed system 100 and/or gas loads 134 may be configured such that the demand for mixed gas from a first gas load (e.g., ECS 136) is satisfied by a first value of the fluid parameter of the mixed gas within supply conduit 120 (e.g., satisfied by a first pressure). Bleed system 100 and/or gas loads 134 may be configured such that the demand for mixed gas from a second gas load (e.g., fuel tank system 138) is satisfied by a second value of the fluid parameter within supply conduit 120 (e.g., satisfied by a second pressure). The first value may be different from the second value. Similarly, a third gas load (e.g., ADU 140) may require a third value different from the first value and/or the second value, and a fourth gas load (e.g., anti-icing system 142) may require a fourth value different from the first value, the second value, and/or the third value. Similarly, different operating combinations among the first gas load, the second gas load, the third gas load, and/or the fourth gas load may require differing values of the fluid parameter within supply conduit 120 to satisfy the combined gas demand of the operating gas loads. Hence, providing a mixed gas based on a single, unvarying system setpoint may result in extracting more higher pressure gas from turbine engine 102 than might actually be required based on the combined gas demand of the operating gas loads. This excess use of the higher pressure gas may reduce the fuel efficiency (e.g., may increase the thrust-specific fuel consumption (TFSC)) achieved during operation of turbine engine 102.

Control circuitry 122 is configured to determine the system setpoint for bleed system 100 using any suitable technique. In some example, the system setpoint is determined by other control circuitry and transmitted to control circuitry 122. In addition or instead, in some examples, control circuitry 122 is configured to establish the system setpoint for bleed system 100. For example, control circuitry 122 may be configured to establish the system setpoint based on an operating status of one or more of gas loads 134. In examples, control circuitry 122 is configured to receive a load signal indicative of an operating status of the one or more of gas loads 134 and determine the system setpoint based on the load signal. The load signal may be, for example, a binary on/off signal indicating whether a gas load within gas loads 134 is operating or secured, a signal indicative of an amount of mixed gas the gas load within gas loads 134 is using or anticipated to use, or some other signal type indicating use of the mixed gas by the gas load within gas loads 134. In examples, control circuitry 122 is configured to receive a plurality of load signals from a plurality of gas loads within gas loads 140 and establish the system setpoint based on the plurality. For example, control circuitry 122 may be configured to receive a first signal from a first gas load (e.g., ECS 136), a second signal from a second gas load (e.g., fuel tank system 138), a third signal from a third gas load (e.g., ADU 140), and/or a fourth signal from a fourth gas load (e.g., anti-icing system 142). Control circuitry 122 may be configured to ascertain a combination of gas loads currently operating within bleed system 100 based the first signal, the second signal, the third signal, and/or the fourth signal. Control circuitry 122 may be configured to establish the system setpoint based on the ascertained combination. Jet pump 118 may alter a mixing ratio of the higher pressure gas to the lower pressure gas to meet the system setpoint established by control circuitry 122, such that jet pump 118 extracts an amount of higher pressure gas from turbine engine 102 based on the combined gas demand of the ascertained combination of gas loads.

Figure 2:
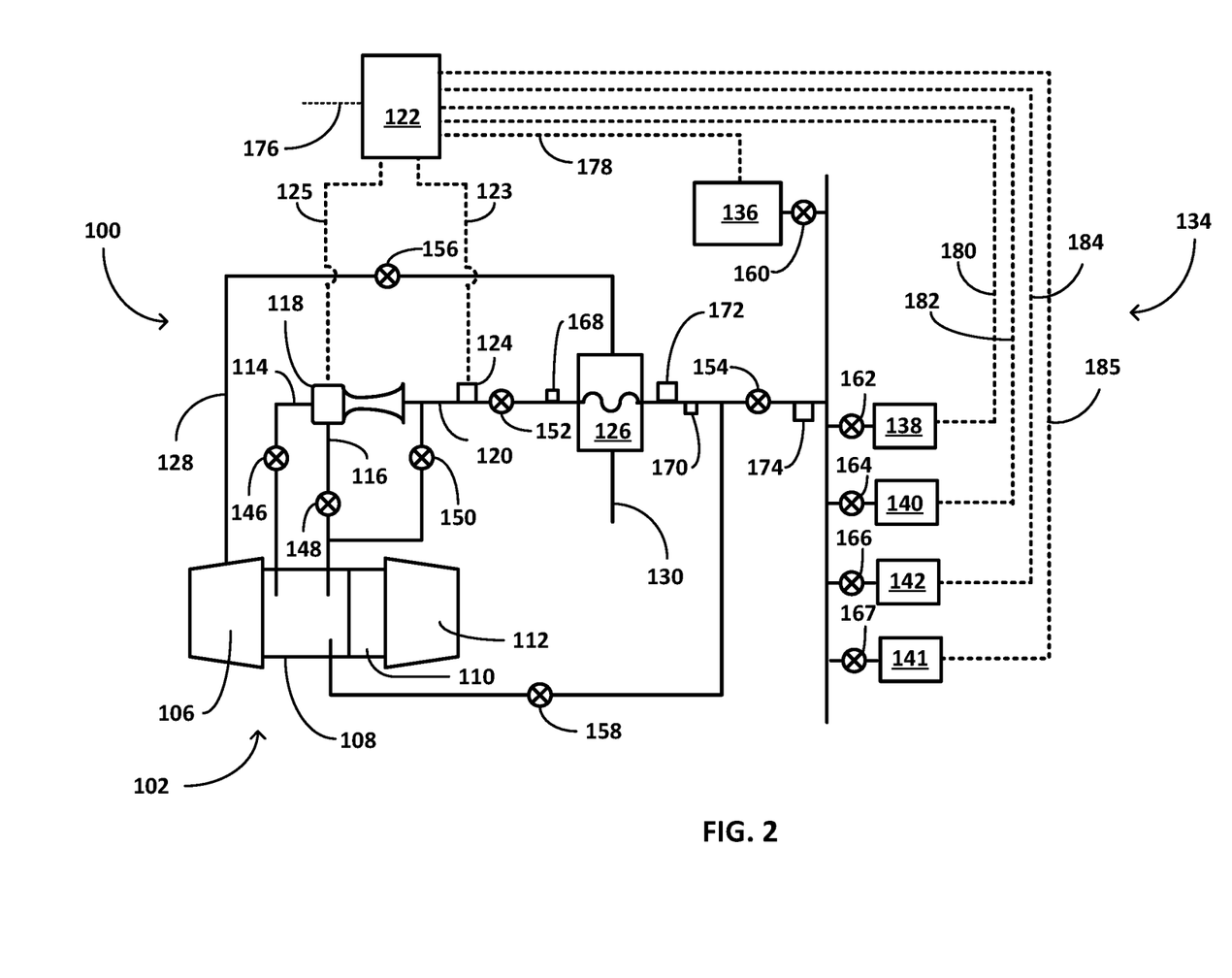
FIG. 2 is a schematic illustration of an example bleed system serving gas loads.

FIG. 2 illustrates an example bleed system 100 including jet pump 118 and one or more gas loads 134. Jet pump 118 is configured to extract a lower pressure gas via conduit 114 and a higher pressure gas via conduit 116 from turbine engine 102. Jet pump 118 is configured to provide a mixed gas to supply conduit 120 for used by one or more gas loads 134, such as ECS 136, fuel tank system 138, ADU 140, anti-icing system 142, and/or pneumatic system 141. Control circuitry 122 is configured to receive a signal indicative of a fluid parameter of the mixed gas from sensor 124 and cause jet pump 118 to vary a mixing ratio of the higher pressure gas to the lower pressure gas extracted based on the signal.

Bleed system 100 may be configured for use on an aircraft, such as aircraft 104 (FIG. 1). Bleed system 100 may include additional valves, sensors, and other equipment at various locations within bleed system 100. For example, bleed system 100 may include one or more of an intermediate pressure check valve 146 ("IPCV") configured to allow a flow of lower pressure gas through conduit 114, a high pressure valve 148 ("HPV") configured to allow a flow of higher pressure gas through conduit 116, a jet pump bypass valve 150 ("JPBPV") configured to bypass a portion of the higher pressure gas around jet pump 118, a mid-pressure valve 152 ("MPV") and/or over pressure shut off valve 154 ("OPSOV") configured to allow a flow of mixed gas in supply conduit 120, a fan air valve 156 ("FAV") configured to allow a flow of gas (e.g., air) from turbine engine fan section 106 via conduit 128 to PCL 126, starter valve 158 configured to allow a flow of mixed gas to turbine engine 102, flow control valve 160 ("FCV") configured to control a flow of the mixed gas to ECS 136, and valve 162, valve 164, valve 166, and valve 167 configured to control a flow of mixed gas to fuel tank system 138, ADU 140, anti-icing system 142, and pneumatic system 141 respectively.

Bleed system 100 may include one or more of bleed temperature sensor 168 ("TB") and/or manifold temperature sensor 170 ("TM") configured to sense a temperature of the mixed gas in supply conduit 120, and first manifold pressure sensor 172 ("PM1") and/or second manifold pressure sensor 174 ("PM2") configured to sense a pressure of the mixed gas in supply conduit 120. Bleed system 100 may include other valves, sensors, and/or control equipment configured to control a flow of gas through bleed system 100.

In some examples, control circuitry 122 is configured to compare the signal received from sensor 124 to a system setpoint and cause jet pump 118 to alter the mixing ratio of the higher pressure gas received via conduit 114 to the lower pressure gas received via conduit 116 based on the comparison. In examples, control circuitry 122 is configured to receive the system setpoint by at least referencing a system setpoint stored by a memory accessible to the control circuitry. Control circuitry 122 may receive the system setpoint via, for example, communication link 176. The system setpoint received by control circuitry 122 may be variable. For example, control circuitry 122 may receive a first setpoint via communication link 176 and cause jet pump 118 to alter the mixing ratio such that the fluid parameter sensed by sensor 124 substantially matches and/or satisfies the system setpoint. Control circuitry 122 may subsequently receive a second setpoint different from the first setpoint via communication link 176 and cause jet pump 118 to alter the mixing ratio such that the fluid parameter sensed by sensor 124 substantially matches and/or satisfies the second setpoint. Hence, control circuitry 122 may be configured to cause jet pump 118 to adjust the higher pressure gas and lower pressure gas extracted to substantially match a variable system setpoint. The ability of control circuitry 122 to cause jet pump 118 to respond to a variable setpoint may reduce the amount of higher pressure gas extracted and limit impacts on turbine engine efficiency as compared to bleed systems configured to operate with a substantially constant and invariable system setpoint.

In some examples, control circuitry 122 may be configured to establish the system setpoint based on one or more load signals indicative of an operating status and/or anticipated gas demand of one or more gas loads 134 within bleed system 100. For example, ECS 136 may be configured to utilize a portion of the mixed gas generated by jet pump 118 as a coolant for one or more air packs supplying air to an aircraft cabin. Control circuitry 122 may be configured to receive a first load signal indicative of (e.g., which changes as a function of) the quantity of the air packs operating or anticipated to operate within ECS 136 via communication link 178. Fuel tank system 138 may be configured to utilize a portion of the mixed gas generated by jet pump 118 to pressurize an ullage space of a fuel tank as aircraft 104 consumes fuel. Control circuitry 122 may be configured to receive a second load signal indicative of a demand for fuel tank pressurization by fuel tank system 138 via communication link 180.

ADU 140 may be configured to utilize a portion of the mixed gas generated by jet pump 118 to drive a gas driven motor configured to pressurize a hydraulic system for operation of control surfaces and/or landing gear of aircraft 104. Control circuitry 122 may be configured to receive a third load signal indicative of a demand by the gas driven motor to substantially maintain the hydraulic system pressure as control surfaces are operated via communication link 182. Anti-icing system 142 may be configured to utilize a portion of the mixed gas generated by jet pump 118 to remove ice or other substances from a wing or other portion of aircraft 104. Control circuitry 122 may be configured to receive a fourth load signal indicative of a demand for anti-icing by anti-icing system 142 via communication link 184. In examples, control circuitry 122 may be configured to receive one or more additional load signals indicative of a demand for mixed gas by pneumatic system 141 via communication link 185. Control circuitry 122 may establish the system setpoint for bleed system 100 based on the load signals received, in order to minimize and/or eliminate an extraction of higher pressure air from turbine engine 102 in excess of that required for satisfactory operation of the gas loads 134.

A gas load (e.g., one or more of the gas loads 134) may be configured to generate the load signal based on the demand and/or anticipated demand for the mixed gas by the gas load. The gas load may be configured to transmit the load signal to control circuitry 122. In examples, some portion of or substantially all of control circuitry 122 may be housed and/or mechanically supported within a controller housing configured to be located adjacent to jet pump 118 or another portion of bleed system 100. In some examples, control circuitry 122 is housed and/or mechanically supported by housings of one or more of gas loads 134 and/or one or more other housings within aircraft 104.

Control circuitry 122 may be configured to interpret any load signals (e.g., load signals received via communication links 178, 180, 182, 184) representing a demand for mixed gas from one or more of gas loads 134. For example, control circuitry 122 may be configured to interpret a load signal indicating demand by indicating whether a gas load is in an operating state consuming and/or anticipated to consume mixed gas or in a secured state wherein a mixed gas demand from the load is substantially negligible and/or absent. Control circuitry 122 may be configured to interpret a load signal indicating demand by indicating a specific and/or anticipated operating configuration of a gas load, such as a number of subsystems (e.g., air packs within ECS 136) operating/and/or anticipated to operate in the gas load. Control circuitry 122 may be configured to receive a load signal from one or more subsystems within an air load configured to operate when the gas load consumes the mixed gas. In examples, control circuitry 122 is configured to interpret load signals indicating a quantity of mixed gas consumed by an air load. For example, a portion of bleed system 100 such as a portion including flow control valve 160, valve 162, valve 164, or valve 166 may be configured to sense a mass flow or other parameter of mixed gas flowing through the bleed system portion and provide a load signal to control circuitry 122 based on the mass flow or other parameter. In examples, one or more gas loads 134 is configured to sense a mass flow or other parameter of mixed gas an provide the load signal to control circuitry 122 based on the mass flow or other parameter.

Sensor 124 may be configured to sense the fluid parameter of the mixed gas at any suitable location within bleed system 100. In some examples, sensor 124 is configured to sense the fluid parameter at a location within bleed system 100 downstream of jet pump 118 and upstream of the one or more gas loads 134. For example, sensor 124 may be configured to sense the fluid parameter downstream of jet pump 118 and upstream of PCL 126. Here, "downstream" connotes a flow direction of a mixed gas from jet pump 118 and to the one or more gas loads 134 and/or PCL 126. "Upstream" connotes a flow direction opposite the downstream direction. Sensor 124 may be located upstream or downstream of other sensors and or components within bleed system 100, such as intermediate pressure check valve 146, high pressure valve 148, jet pump bypass valve 150, mid-pressure valve 152, over pressure shutoff valve 154, fan air valve 156, flow control valve 160, valve 162, valve 164, valve 166, starter valve 158, bleed temperature sensor 168, manifold temperature sensor 170, first manifold pressure sensor 172, and/or second manifold pressure sensor 174.

In some examples, control circuitry 122 is configured to receive signals indicative of a fluid parameter from additional sensors within bleed system 100 in addition to sensor 124. For example, control circuitry 122 may be configured to receive one or more signals indicative of a fluid parameter from bleed temperature sensor 168, first manifold pressure sensor 172, manifold temperature sensor 170, second manifold pressure sensor 174, and other sensors configured to sense a fluid parameter of the mixed gas within bleed system 100. The additional sensors may be configured to sense the same type of fluid parameter as sensor 124, or may be configured to sense a type of fluid parameter different from that sensed by sensor 124. For example, control circuitry 122 may be configured to receive a first signal from sensor 124 indicative of a pressure of the mixed gas and receive one or more additional signals indicative of a temperature, flow rate, or other fluid parameter of the mixed gas. In these examples, control circuitry 122 is configured to cause jet pump 118 to alter a mixing ratio of the higher pressure gas received via conduit 116 and the lower pressure gas received via conduit 114 based on the first signal and the one or more additional signals.

Turbine engine 102 may be configured to receive a gas (e.g., air) from turbine engine fan section 106 and progressively increase the pressure of the gas through a series of successive compressor stages. Turbine engine 102 may be configured such that a first compressor stage compresses the gas to a first pressure, a second compressor stage receives the gas from the first compressor stage and increases the pressure to a second pressure greater than the first pressure, a third compressor stage receives the gas from the second compressor stage and increases the pressure to a third pressure greater than the second pressure, and so on until turbine engine 102 issues the gas from a final compressor stage to combustion section 110. In some examples, bleed system 100 is configured to extract higher pressure gas via conduit 116 from a compressor stage outside of the last 20% of the compressor stages of turbine engine 102. For example, turbine engine 102 may include a plurality of compressor stages designated one through ten, with the tenth compressor stage configured to issue compressed gas to combustion section 110, such that the 20% of the compressor stages includes compressor stage nine and compressor stage ten.

In some examples, turbine engine 102 is configured to increase a pressure of a gas stream as the gas stream flows from an initial compressor stage to a penultimate compressor stage to a final compressor stage, wherein the penultimate compressor stage is configured to issue the compressed gas to the final compressor stage and the final compressor stage is configured to issue the compressed gas to combustion section 110. Bleed system 100 may be configured to provide the higher pressure gas via conduit 116 from the gas stream prior to the gas stream flowing to one of the penultimate compressor stage or the final pressure stage.

In some examples, control circuitry 122 is configured to adjust the system setpoint based on operating loads such that bleed system 100 may extract the higher pressure gas (e.g., via conduit 116) from a compressor stage outside of the last 20% of the compressor stages of turbine engine 102, such as from a seventh or eighth compressor stage, and/or such that bleed system 100 may extract the higher pressure gas from a gas stream prior to the prior to the gas stream flowing to a penultimate or final compressor stage. Extracting the higher pressure gas prior to the final compressor stages of turbine engine 102 helps avoids an expenditure of compression energy on the higher pressure gas over the final compressor stages of turbine engine 102, potentially increasing a fuel efficiency (e.g., decreasing a thrust-specific fuel consumption (TFSC)) achieved during operation of turbine engine 102.

Bleed system 100 can include any suitable jet pump that is configured to be controlled by control circuitry 122 to adjust a ratio of a lower pressure gas and a higher pressure gas mixed by the jet pump. The jet pump can include a variable nozzle or other variable geometry the enables variable mixing of bleed air to meet the minimum pressure and flow requirements for gas loads 134 served by bleed system 100.

In examples, jet pump 118 can be sized and controlled such that jet pump bypass valve 150 can be eliminated. Jet pump 118 may be configured to position such that the flow restriction and pressure drop of the HP air flow path is reduced adequately such that jet pump bypass valve 150 can be eliminated.

Figure 3:
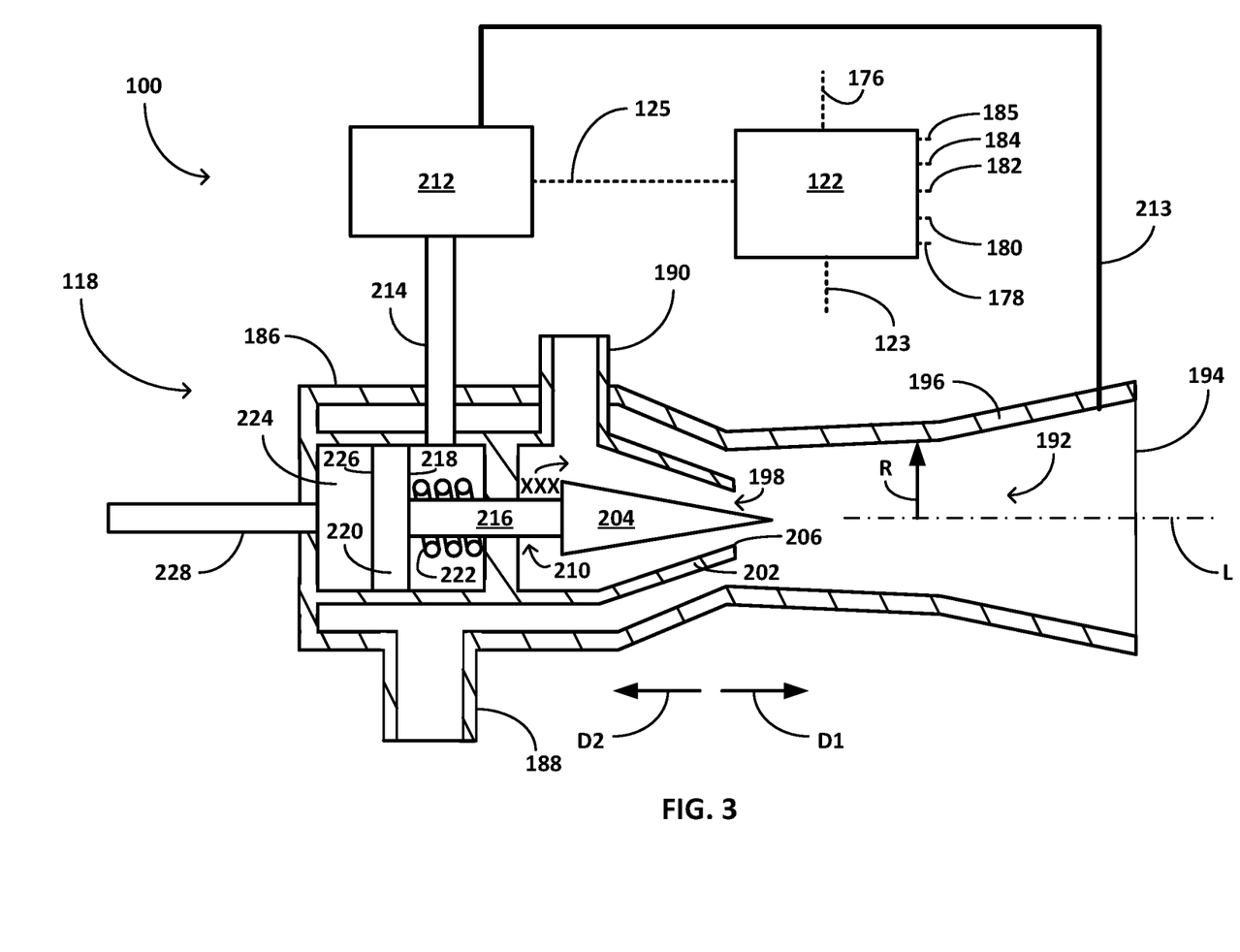
FIG. 3 is a schematic illustration of an example jet pump.

FIG. 3 is a conceptual diagram of an example bleed system 100 including an example jet pump 118 and control circuitry 122. Portions of jet pump 118 are illustrated in cross-section with a cutting plane parallel to the page. A body 186 of jet pump 118 ("pump body 186") defines a first inlet 188 configured to receive a first gas flow (e.g., lower pressure gas via conduit 114) and a second inlet 190 configured to receive a second gas flow (e.g., higher pressure gas from conduit 116). Jet pump 118 is configured to combine the first gas flow received via first inlet 188 and the second gas flow received via second inlet 190 to generate a mixed gas in an outlet region 192 defined by pump body 186. Jet pump 118 is configured to issue a flow of the mixed gas (e.g., to supply conduit 120) via a pump outlet 194 defined by pump body 186. In examples, jet pump 118 is configured to issue the flow of mixed gas substantially along an axis L defined by jet pump 118 and intersecting pump outlet 194. Axis L may be perpendicular to the cutting plane of FIG. 3.

In examples, pump body 186 defines a diffuser 196 configured to allow an expansion of the mixed gas as the mixed gas flows toward pump outlet 194. Jet pump 118 may be configured such that the mixed gas expands and cools as the mixed gas flows through diffuser 196 toward pump outlet 194. Jet pump 118 may be configured to cause the mixed gas to cool (e.g., to be at a lower temperature than the higher pressure supply 190 alone) to reduce a cooling load on, for example, PCL 126 or another cooling component. In examples, jet pump 118 is configured to receive a higher pressure gas at a first temperature via one of first inlet 188 or second inlet 190 and a lower pressure gas at a second temperature less than the first temperature via the other of first inlet 188 or second inlet 190. Diffuser 196 may be configured such that as the mixed gas flows through outlet region 192 toward pump outlet 194, the expansion of the mixed gas results in a mixed gas temperature less than at least the first temperature of the higher pressure gas. In examples, the diffuser 196 is configured such that the expansion results in a mixed gas temperature less than the second temperature of the lower pressure gas. Diffuser 196 may substantially surround outlet region 192 and define an increasing flow area (or volume) for the mixed gas as the mixed gas flows within outlet region 192 toward pump outlet 194. For example, diffuser 196 may be configured such that a cross-sectional dimension R perpendicular to axis L and intersecting diffuser 196, increases as the mixed flow flows within outlet region 192 toward pump outlet 194. For example, dimension R may be a radius if pump body 186 is circular in cross-section (taken orthogonal to axis L).

Jet pump 118 is configured to produce the mixed gas in outlet region 192 by at least mixing the first gas flow received via first inlet 188 and the second gas flow received via second inlet 190 in a mixing ratio. The mixing ratio defines the relative proportion of the second gas flow to the first gas flow combined when jet pump 118 produces the mixed gas. In examples, the mixing ratio defines a ratio of a mass of a second gas of the second gas flow to a mass of a first gas of the first gas flow. The mass of the second gas and the mass of the first gas may be defined as mass quantities, mass flow rates, or any other mass-dependent parameters of the second gas flow and the first gas flow. The first gas and the second gas may be gases having the same or a substantially similar compositions. In examples, air comprises the first gas and the second gas.

In examples, the second gas flow has a pressure different from a pressure of the first gas flow. For example, one of the second gas flow or the first gas flow may be higher pressure gas received via conduit 116 (FIG. 1, 2) and the other of the second gas flow or the first gas flow may be a lower pressure gas received via conduit 114. The mixing ratio may define the relative proportion of the higher pressure gas to the lower pressure gas combined to produce the mixing ratio.

Jet pump 118 is configured to alter the mixing ratio in order to establish a steady-state mixing ratio which produces a fluid parameter of the mixed gas satisfying the system setpoint for the fluid parameter sensed by sensor 124, 172, 174 (FIG. 1, 2). For example, if the fluid parameter sensed by sensor 124, 172 174 is a pressure and the system setpoint is a pressure setpoint, jet pump 118 may be configured to establish a steady-state mixing ratio that causes a certain amount of the second gas (e.g., a higher pressure gas) to mix with a certain amount of the first gas (e.g., the lower pressure gas) such that the mixed gas exiting pump outlet 194 generates a pressure at sensor 124, 172, 174 satisfying the pressure setpoint. In examples, jet pump 118 is configured to establish the steady-state mixing ratio by controlling the mass flow of a higher pressure gas received from turbine engine 102 (e.g., via conduit 116 (FIG. 1,2)) and/or the lower pressure gas received from turbine engine 102 (e.g., from conduit 114). In examples, the system setpoint is defined by a range of values around a central setpoint value, and the fluid parameter of the mixed gas satisfies the system setpoint when the fluid parameter falls within the range. In examples, the system setpoint is defined by a specific setpoint value, and the fluid parameter of the mixed gas satisfies the system setpoint when the fluid parameter is substantially equal to (e.g., within 1%, 5%, 10%, or some other percentage of) the specific setpoint value.

Jet pump 118 may be configured to control the mass flows in any manner. In examples, jet pump 118 defines a flow area to control the mass flow. For example, jet pump 118 may be configured to define a flow area 198 configured to enable passage therethrough of the second gas flow received via second inlet 190. In examples, flow area 198 is an area defined between an internal body 202 and a restriction device 204. Internal body 202 may define a perimeter 206 defining an opening for the second gas to flow into outlet region 192 from second inlet 190, and restriction device 204 may be configured to restrict the flow of the second gas through the opening defined by perimeter 206. In some examples, restriction device 204 is configured to insert into the opening defined by perimeter 206. Internal body 202 may define a chamber 208 configured to receive the second gas flow and cause the second gas to flow through the opening defined by perimeter 206. Internal body 202 may be, for example, a nozzle body, and restriction device 204 may be a needle configured to restrict flow through a nozzle opening defined by the nozzle body. Internal body 202 may be mechanically supported by pump body 186.

Jet pump 118 may be configured to alter the mixing ratio by altering a dimension of flow area 198. Jet pump 118 may be configured such that the dimension of flow area 198 controls a mass flow of the second gas flow, such that the dimension of flow area 198 controls the mixing ratio defined. In examples, jet pump 118 includes a translating member 210 configured to translate relative to pump body 186 to alter a dimension of flow area 198. Translating member 210 may include restrictive device 204. In examples, translating member 210 and/or restricting device 204 is configured as a jet pump needle. Translating member 210 may be configured to cause restrictive device 204 to translate relative to perimeter 206 when translating member 210 translates relative to pump body 186. Restrictive device 204 may be configured to alter the dimension of flow area 198 when restrictive device 204 translates. For example, restrictive device 204 may be configured to decrease flow area 198 when restrictive device 204 translates in a first direction D1 toward perimeter 206. Restrictive device 204 may be configured to increase a flow area 198 when restrictive device 204 translates in a second direction D2 away from perimeter 206. Hence, jet pump 118 may be configured to alter the mixing ratio of the second gas flow (e.g., the higher gas flow) to the first gas flow (e.g., the lower gas flow) combined to produce the mixed gas in outlet region 192 by causing a translation of translating member 210, e.g., under the control of control circuitry 122.

In examples, bleed system 100 includes a device 212 configured to exert a mechanical force on jet pump 118 to cause jet pump 118 to alter the mixing ratio. Control circuitry 122 may be configured to cause device 212 to exert the mechanical force on jet pump 118. In examples, device 212 is configured to cause translating member 210 to translate when device 212 exerts the mechanical force on jet pump 118. Device 212 may be configured to exert the mechanical force on jet pump 118 in any suitable manner. In some examples, device 212 is configured to provide a pressurized control fluid (e.g., air, fuel, or hydraulic fluid) via a control fluid conduit 214 to jet pump 118 to exert the mechanical force on jet pump 118. Device 212 may include, for example, a torque motor configured to provide the pressurized control fluid. In some examples, the torque motor is configured to receive an inlet flow of gas from bleed system 100, an engine fuel system, or an aircraft hydraulic system and generate the pressurized control fluid using the inlet flow. In some examples, device 212 includes an electric motor configured to generate a torque and/or linear force to exert the mechanical force on jet pump 118. For example, device 212 may be configured to rotate a nut threadably engaged with jet pump 118 to exert the mechanical force on jet pump 118. In some examples, device 212 includes a linear motor configured to generate a linear thrust to exert the mechanical force on jet pump 118.

Control circuitry 122 may be configured to transmit a control signal to device 212 to cause device 212 to exert the mechanical force on jet pump 118. In examples, control circuitry 122 is configured to transmit the control signal to device 212 via communication link 125. Device 212 may be configured to exert the mechanical force on jet pump 118 in response to the control signal received, such that the control signal from control circuitry 122 causes jet pump 118 to alter the mixing ratio. Control circuitry 122 is configured to transmit the control signal to device 212 in response to a signal indicative of a fluid parameter received from sensor 124 (FIG. 1, 2) via communication link 123. In examples, control circuitry 122 is configured to compare the indicative signal to a system setpoint (e.g., a system setpoint received via communication link 176) and transmit the control signal to device 212 via communication link 125 based on the comparison. In some example, control circuitry 122 is configured to establish the system setpoint based on one or more load signals received via communication links 178, 180, 182, 184, 185.

For example, control circuitry 122 may receive a signal from sensor 124, 172 or 174 (FIG. 1, 2) via communication link 123 indicative of a fluid parameter of the mixed gas at a location within bleed system 100, such as supply conduit 120. Control circuitry 122 may compare the indicative signal to a system setpoint and, based on the comparison, transmit a control signal via communication link 125 causing device 212 to exert a mechanical force on jet pump 118. Jet pump 118 may alter the mixing ratio of the second gas flow received via second inlet 190 (e.g., a higher pressure gas received via conduit 116) to the first gas flow received via first inlet 188 (e.g., a lower pressure gas received via conduit 114) in response to the mechanical force. The altered mixing ratio may alter the fluid parameter of the mixed gas within outlet region 192 of jet pump 118, causing the fluid parameter of the mixed gas at the location within bleed system 100 to alter. Sensor 124, 172, 174 may sense the altered fluid parameter within bleed system 100 and communicate a signal indicative of the altered fluid parameter to control circuitry 122. When the signal indicative of the altered fluid parameter indicates a fluid parameter satisfying the system setpoint, control circuitry 122 may communicate with device 212 to cause device 212 to cease causing jet pump 118 to alter the mixing ratio.

In examples, jet pump 118 is configured such that the mechanical force exerted by device 212 causes translating member 210 to translate to alter the mixing ratio. In examples, translating member 210 includes a shaft 216 configured to translate relative to pump body 186 when the mechanical force is exerted on shaft 216. Shaft 216 may be configured to cause restriction device 204 to translate when shaft 216 translates. In examples, jet pump 118 is configured to cause the control fluid received via conduit 214 to exert the force on shaft 216. For example, jet pump 118 may be configured to cause the control fluid to exert a pressure on a pressure area 218 defined by jet pump 118 to exert the mechanical force on jet pump 118. Jet pump 118 may be configured to cause shaft 216 to translate when the control fluid exerts the mechanical force on pressure area 218. In some examples, jet pump 118 includes a piston 220 defining pressure area 218 and configured such that the pressure exerted on pressure area 218 causes piston 220 to exerts a force on shaft 216, causing shaft 216 to translate relative to pump body 186. Translation of shaft 216 relative to pump body 186 may cause translation of restriction device 204 relative to perimeter 206, altering a dimension of flow area 198 and altering the mixing ratio of the mixed gas produced by jet pump 118.

In some examples, jet pump 118 is configured to produce a resisting force opposing the mechanical force exerted by device 212, such that jet pump 118 may be caused to both increase and decrease the mixing ratio by a mechanical force which acts in a single direction. The resisting force produced by jet pump 118 may allow device 212 to be configured to generate the mechanical force in only a single direction (e.g., the single direction produced when a control fluid acts on pressure area 218), as opposed to requiring a configuration of device 212 capable of exerting the mechanical force in multiple directions. In examples, jet pump 118 is configured such that the resisting force produced causes translation of translating member 210 in a direction (e.g., the direction D1) substantially opposite a translating direction (e.g., the direction D2) of translating member 210 caused by the mechanical force exerted by device 212. Jet pump 118 may be configured to alter the mixing ratio when the mechanical force on translating member 210 provided by device 212 is either greater than or less than the resisting force on translating member 210 provided by jet pump 118. For example, jet pump 118 may be configured such that when the mechanical force exerted on translating member 210 is greater than the resisting force exerted on translating member 210, translating member 210 translates in the direction D2 to alter the mixing ratio. Jet pump 118 may be configured such that when the mechanical force exerted on translating member 210 is less than the resisting force exerted on translating member 210, translating member 210 translates in the direction D1 to alter the mixing ratio. Hence, jet pump 118 may be configured such that variation in a magnitude of the mechanical force exerted by device 212 causes jet pump 118 to alter the mixing ratio, such that device 212 may be configured to exert the mechanical force in only a single direction.

Jet pump 118 may be configured to establish a steady-state (e.g., unaltering and/or unvarying) mixing ratio when the mechanical force exerted on translating member 210 substantially equals the resisting force exerted on translating member 210 by jet pump 118. Jet pump 118 may be configured such that when device 212 exerts a mechanical force on translating member 210 which substantially equals the resisting force exerted on translating member 210 by jet pump 118, jet pump 118 establishes translating member 210 in a substantially stationary position relative to pump body 186 to establish a substantially steady-state mixing ratio.

In examples, jet pump 118 includes a compressible and/or extendable element 222 such as a spring to generate the resisting force. Element 222 may be configured such that, when the mechanical force exerted by device 212 causes a compression or extension of element 222, element 222 generates the resisting force in a direction opposing the mechanical force. In some examples, jet pump 118 (e.g., pump body 186) defines a chamber 224 configured to hold a compressible gas (e.g., air) which acts against a second pressure area 226 to generate the resisting force. Second pressure area 226 may be, for example, an area on a side of piston 220 opposite the side defining pressure area 218. Chamber 224 may be configured such that, when the mechanical force exerted by device 212 causes a compression of the gas within chamber 224, the compression of the gas causes chamber 224 to the generate the resisting force in a direction opposing the mechanical force. In some examples, chamber 224 includes a fluid conduit 228 defining a flow path for the compressible gas to enter and/or exit chamber 224. In some examples, fluid conduit 228 is fluidly coupled to bleed system 100.

Jet pump 118 may be configured to vary a magnitude of the resisting force based on a position of translating member 210, such that the mixing ratio established by jet pump 118 is based on a magnitude of the mechanical force exerted by device 212. For example, compressible element 222 may be configured such that the resisting force increases as compressible element 222 is further compressed and/or extended. Chamber 224 may be configured such that the resisting force increases as a gas within chamber 224 is further compressed. This may provide a measure of feedback to reduce overshoot, response time, settling time, and/or other control characteristics when control circuitry 122 causes jet pump 118 to alter the mixing ratio in response to a signal from sensor 124. For example, when device 212 is configured to provide a control fluid via control fluid conduit 214 to exert the mechanical force by acting on pressure area 218, control circuitry 122 may cause the indicative signal to smoothly approach a system setpoint by directing device 212 to increase or decrease the pressure of the control fluid as the system setpoint is approached. This may increase the responsiveness of bleed system 100 when control circuitry 122 changes a system setpoint for the fluid parameter based on a setpoint signal received via communication link 176 and/or one or more loads signals received via communication links 178, 180, 182, 184, 185.

In examples, bleed system 100 is configured to provide a pneumatic feedback to jet pump 118 to cause jet pump 118 to alter the mixing ratio. Bleed system 100 may be configured to substantially sense a parameter of the mixed gas at a location in bleed system 100 using feedback line 213 and provide the sensed parameter to jet pump 118, device 212, and/or another component of bleed system 100 to cause jet pump 118 to alter the mixing ratio. In examples, the sensed parameter is a pressure and feedback line 213 is a pneumatic feedback line configured to substantially port a portion of the mixed gas to jet pump 118, device 212, and/or another component of bleed system 100 from the sensed location. Feedback line 213 may sense the mixed gas at any location within bleed system 100. In examples, feedback line 213 is configured to sense the fluid parameter 192 at a location substantially defined by diffuser 196. In some examples, feedback line 213 is configured to port some portion of the mixed gas from diffuser section 196 to device 212 to cause jet pump 118 to alter the mixing ratio.

Device 212 may be configured to vary the magnitude of the mechanical force exerted on jet pump 118 to cause jet pump 118 to alter the mixing ratio. Device 212 may be configured to vary the magnitude of the mechanical force to, for example, cause the mechanical force to exceed the resistance force or cause the resistance force to exceed the mechanical force in order to alter the mixing ratio. For example, device 212 may be configured to increase or decrease a pressure of the control fluid received by jet pump 118 via control fluid conduit 214 to vary the magnitude of the mechanical force exerted. Device 212 may be configured to vary a rotary torque or linear force exerted on jet pump 118 to vary the magnitude of the mechanical force exerted. In examples, device 212 is configured to vary the magnitude of the force exerted based on the control signal received from control circuitry 122 via communication link 125. In examples, device 212 is configured to vary the magnitude based on a signal characteristic (e.g., a frequency and/or amplitude) of the signal received from control circuitry 122.

In examples, jet pump 118 is configured to utilize air as control fluid. Device 212 may be configured to pressurize the air and provide the pressurized air as the control fluid via control fluid conduit 214. The use of air as a control fluid may improve a responsiveness and/or reliability of jet pump 118 in higher temperature environments, such as environments in close proximity to an operating engine such as turbine engine 102. In examples, jet pump 118 is configured to operate within an environment having a temperature greater than about 300 degrees Celsius (572 Fahrenheit), greater than about 400 degrees Celsius (572 degrees Fahrenheit), and/or 500 degrees Celsius (932 degrees Fahrenheit). In other examples, jet pump 118 and device 212 may be configured to use a different fluid as the control fluid, such as water, oil, or another hydraulic fluid.

Figure 4:
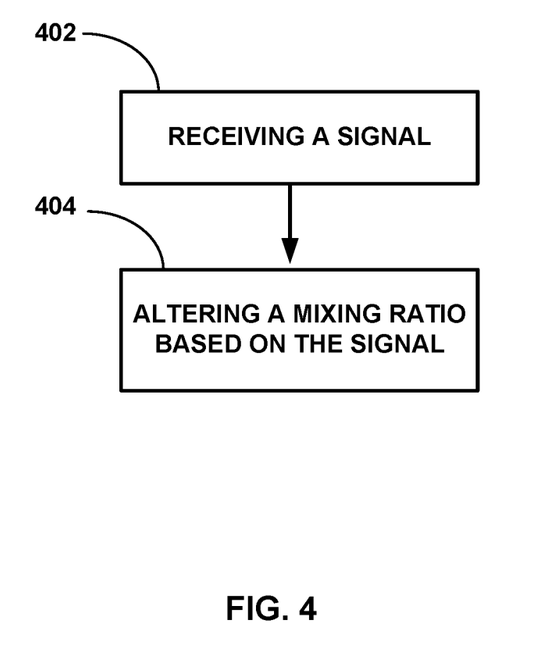
FIG. 4 is a flow diagram illustrating an example method of producing a mixed gas.

FIG. 4 illustrates a flow diagram of an example technique for controlling a mixed gas within a bleed system. Although the technique is described with reference to jet pump 118 (FIGS. 1-3), in other examples, the technique may be used with device. In addition, control circuitry 122 alone or in combination with controllers of other devices can perform any part of the technique shown in FIG. 4.

Control circuitry 122 receives a signal indicative of a fluid parameter of a mixed gas (402). The signal may indicate the fluid parameter of the mixed gas in a bleed system 100 configured to provide the mixed gas to one or more gas loads 134, such as ECS 136, fuel tank system 138, ADU 140, and/or anti-icing system 142. The one or more gas loads may be configured to operate as transient loads within bleed system 100, such that the overall demands of gas loads 134 may vary during operation of bleed system 100. In examples, control circuitry 122 receives the indicative signal from sensor 124, 172, 174 configured to sense the fluid parameter of the mixed gas within bleed system 100. The fluid parameter may be, for example, a pressure, a temperature, a flow rate, or some other fluid parameter of the mixed gas within bleed system 100.

Control circuitry 122 causes jet pump 118 to alter the mixing ratio based on the signal indicative of the fluid parameter received (404). In examples, control circuitry 122 compares the indicative signal to a system setpoint and causes jet pump 118 to alter the mixing ratio based on the comparison. Control circuitry 122 may be configured to receive the system setpoint via communication link 176 or establish the system setpoint, e.g., as described below. Control circuitry 122 is configured to cause jet pump 118 to respond to varying setpoints. For example, control circuitry 122 may receive a first setpoint and cause jet pump 118 to alter the mixing ratio such that the fluid parameter sensed by sensor 124 substantially matches and/or satisfies the system setpoint. Control circuitry 122 may subsequently receive a second setpoint different from the first setpoint and cause jet pump 118 to alter the mixing ratio such that the fluid parameter sensed by sensor 124, 172,174 substantially matches and/or satisfies the second setpoint.

In some examples, control circuitry 122 is configured to establish the system setpoint. In examples, control circuitry receives one or more load signals from gas loads 134 via communication links 178, 180, 182, 184, 185 and establishes the system setpoint based on the one or more load signals.

Control circuitry 122 may be configured to cause jet pump 118 alter the mixing ratio by at least altering a mass flow of the higher pressure gas and/or the lower pressure gas received from turbine engine 102 as jet pump 118 produces the mixed gas. For example, if jet pump 118 defines flow area 198 to control the mass flow, then control circuitry 122 may cause jet pump 118 to alter a dimension of flow area 198 to alter the mixing ratio, such as by causing jet pump 118 to translate restriction device 204 to alter the dimension of flow area 198.

In examples, control circuitry 122 is configured to cause device 212 to exert a mechanical force on jet pump 118 to cause jet pump 118 to alter the mixing ratio. Device 212 may be configured to cause translating member 210 to translate when control circuitry causes device 212 to exert the mechanical force. In examples, device 212 is configured to provide a pressurized control fluid (e.g., air) via a control fluid conduit 214 to jet pump 118 to exert the mechanical force by acting on pressure area 218. In some examples, device 212 includes an electric motor configured to generate a torque and/or linear force to exert the mechanical force on jet pump 118.

Device 212 may exert the mechanical force in a single direction on jet pump 118 to cause jet pump 118 to alter the mixing ratio (e.g., to increase or decrease the mixing ratio). Jet pump 118 may produce a resisting force opposing the mechanical force exerted by device 212. Jet pump 118 may alter the mixing ratio when the mechanical force on translating member 210 provided by device 212 is either greater than or less than the resisting force on translating member 210 provided by jet pump 118. In examples, jet pump 118 generates the resisting force using compressible and/or extendable element 222 and/or chamber 224. Jet pump 118 may vary a magnitude of the resisting force based on a position of translating member 210, such that the mixing ratio established by jet pump 118 is based on a magnitude of the mechanical force exerted by device 212.

In examples, control circuitry 122 causes device 212 to vary the magnitude of the mechanical force exerted on jet pump 118 to cause jet pump 118 to alter the mixing ratio. Control circuitry may cause device 212 to vary the magnitude of the mechanical force by transmitting a control signal to device 212 via communication link 125. Control circuitry 122 may cause device 212 to vary the magnitude of the mechanical force to cause the mechanical force to exceed the resistance force or cause the resistance force to exceed the mechanical force. In examples, control circuitry 122 causes device 212 to increase or decrease a pressure of the control fluid received by jet pump 118 via control fluid conduit 214 to vary the magnitude of the mechanical force. In examples, control circuitry 122 causes device 212 to vary a rotary torque or linear force exerted on jet pump 118 to vary the magnitude of the mechanical force.

Control circuitry 122 may include any suitable arrangement of hardware, software, firmware, or any combination thereof, to perform the techniques attributed to control circuitry 122 herein. Examples of control circuitry 122 include any one or more microprocessors, digital signal processors (DSPs), application specific integrated circuits (ASICs), field programmable gate arrays (FPGAs), or any other equivalent integrated or discrete logic circuitry, as well as any combinations of such components. When control circuitry 122 includes software or firmware, control circuitry 122 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

A system setpoint for bleed system 100 may be stored in a memory of control circuitry 122 or in another device communicatively coupled to control circuitry 122. The memory may include any volatile or non-volatile media, such as a random access memory (RAM), read only memory (ROM), non-volatile RAM (NVRAM), electrically erasable programmable ROM (EEPROM), flash memory, and the like. In addition, in some examples, the memory or another memory may also store executable instructions for causing control circuitry 122 described herein to perform the actions attributed to it.

Communication links 123, 125, 176, 178, 180, 182, 184, 185 may be hard-line and/or wireless communications links. Communication links 123, 125, 176, 178, 180, 182, 184, 185 may comprise some portion of control circuitry 122, sensor 124, and/or one or more of gas loads 134. Communication links 123, 125, 176, 178, 180, 182, 184, 185 may comprise a wireless Internet connection, a direct wireless connection such as wireless LAN, Bluetooth™, Wi-Fi™, and/or an infrared connection. Communication links 123, 125, 176, 178, 180, 182, 184, 185 may utilize any wireless or remote communication protocol.

Sensor 124, bleed temperature sensor 168, manifold temperature sensor 170, first manifold pressure sensor 172, and/or second manifold pressure sensor 174 (collectively "bleed system sensors") may be configured to generate a signal indicative of a fluid parameter at any location within bleed system 100. One or more of the bleed system sensors may be configured to generate the signal as a result of an interaction with the mixed gas within bleed system 100. One or more of the bleed system sensors may include a transducer configured to transduce the interaction into the signal indicative of the fluid parameter. The indicative signal may be an analog electrical signal or a digital signal. In some examples, one or more of the bleed system sensors may include processing circuitry configured to interpret a response of the transducer and generate the indicative signal, and/or control circuitry 122 may include processing circuitry configured to interpret a response of the transducer and generate the indicative signal. One or more of the bleed system sensors may be configured to communicate the indicative signal indicative to other devices in data communication the one or more of the bleed system sensors.

Intermediate pressure check valve 146, high pressure valve 148, jet pump bypass valve 150, mid-pressure valve 152, over pressure shut off valve 154, fan air valve 156, flow control valve 160, valve 162, valve 164, and/or valve 166 (collectively "bleed system valves") may be configured to operate in any manner and with any type of valve operation system. One or more of the bleed system valves may be a pneumatically operated valve, a hydraulically operated valve, a manually operated valve, a motor-driven valve, or a valve configured to operate in another manner. One or more of the bleed system valves may be configured to operate based on a communication from control circuitry 122 or other control circuitry. Control circuitry 122 or the other control circuitry may be configured to cause operation of one or more of the bleed system valves based on the fluid parameter of the mixed gas within bleed system 100, other parameters within bleed system 100, other operations conducted by aircraft 104, and/or other reasons.

The techniques described in this disclosure, including those attributed to control circuitry 122 and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components, and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A system comprising: a jet pump configured to receive a lower pressure gas from a lower pressure stage of a turbine engine and receive a higher pressure gas from a higher pressure stage of the turbine engine, wherein the jet pump is configured to combine the lower pressure gas and the higher pressure gas to produce a mixed gas, and wherein the jet pump is configured alter a mixing ratio of the higher pressure gas to the lower pressure gas combined when the jet pump produces the mixed gas; and control circuitry configured to receive a signal indicative of a fluid parameter of the mixed gas, wherein the control circuitry is configured to cause the jet pump to alter the mixing ratio based on the signal.

Example 2: The system of example 1, wherein the control circuitry is configured to determine a setpoint for the fluid parameter, and wherein the control circuitry is configured to compare the fluid parameter indicated by the signal with the setpoint and control the jet pump to alter the mixing ratio based on the comparison.

Example 3: The system of example 1 or example 2, wherein the control circuitry is configured to receive a load signal from a load configured to receive the mixed gas, wherein the control circuitry is configured to determine the setpoint based on the load signal.

Example 4: The system of any of examples 1-3, further comprising a load configured to receive the mixed gas, wherein the control circuitry is configured to cause the jet pump to alter the mixing ratio when the load receives the mixed gas, and wherein the load comprises one or more of: an environmental control system configured to provide air to a cabin and enable a heat transfer between the mixed gas and the air, an air drive unit configured to pressurize a hydraulic system using the mixed gas, an anti-icing system configured to cause the removal of ice from an aircraft wing, a fuel tank system, or a pneumatic system configured to receive the mixed gas.

Example 5: The system of any of examples 1-4, wherein: the jet pump is configured to receive a flow of the higher pressure gas and a flow of the lower pressure gas, the jet pump is configured to mix the flow of the higher pressure gas and the flow of lower pressure gas to produce the mixed gas, and the jet pump is configured to alter the flow of the higher pressure gas to alter the mixing ratio.

Example 6: The system of any of examples 1-5, further comprising a sensor configured to sense the fluid parameter of the mixed gas, wherein the sensor is configured to communicate the signal to the control circuitry.

Example 7: The system of any of examples 1-6, wherein the jet pump includes a diffuser configured to expand the mixed gas, and wherein the signal is indicative of a fluid parameter of the expanded mixed gas.

Example 8: The system of any of examples 1-7, wherein the jet pump is configured to issue a flow of the mixed gas in an upstream direction to one or more gas loads configured to receive the mixed gas, and wherein the signal is indicative of a fluid parameter of the mixed gas downstream of the one or more loads.

Example 9: The system of any of examples 1-8, wherein the jet pump includes a pump body and a variable nozzle, wherein the variable nozzle is configured to translate relative to the pump body to alter the mixing ratio, and wherein the control circuitry is configured to cause the jet pump to alter the mixing ratio by at least translating the variable nozzle relative to the pump body.

Example 10: The system of any of examples 1-9, wherein the jet pump is configured to alter the mixing ratio based on a control signal received from the control circuitry, wherein the control circuitry is configured to generate the control signal based on the signal indicative of the fluid parameter.

Example 11: The system of any of examples 1-10, further comprising a device configured to exert a mechanical force on the jet pump to cause the jet pump to alter the mixing ratio, wherein the device is configured to exert the mechanical force on the jet pump in response to a control signal, and wherein the control circuitry is configured to communicate the control signal to the device.

Example 12: The system of example 11, wherein the device is configured to vary an amount of the mechanical force exerted on the jet pump based on a signal characteristic of the control signal, and wherein the jet pump is configured to establish a mixing ratio based on the amount of the mechanical force.

Example 13: The system of example 11 or example 12, wherein: the device is configured to exert the mechanical force using a control fluid having a pressure, the device is configured to vary the pressure of the control fluid to vary the amount of the mechanical force, and the device is configured to establish the pressure of the control fluid based on the value of the control signal.

Example 14: The system of any of examples 1-13, further comprising the turbine engine, wherein the turbine engine is configured to increase a pressure of an gas stream as the gas stream flows from an initial compressor stage to a penultimate compressor stage to a final compressor stage, wherein the penultimate compressor stage is configured to issue the compressed gas to the final compressor stage, wherein the final compressor stage is configured to issue the compressed gas to a combustion chamber, and wherein the system is configured to provide the higher pressure gas from the gas stream prior to the gas stream flowing to one of the penultimate compressor stage or the final pressure stage.

Example 15: A system, comprising: a jet pump configured to receive a lower pressure gas from a lower pressure stage of a turbine engine and receive a higher pressure gas from a higher pressure stage of the turbine engine; wherein the jet pump is configured to combine the lower pressure gas and the higher pressure gas to produce a mixed gas, wherein the jet pump is configured alter a mixing ratio of the higher pressure gas to the lower pressure gas combined when the jet pump produces the mixed gas, and wherein the jet pump is configured to issue a flow of the mixed gas in a downstream direction to a load configured to receive the mixed gas; and control circuitry, wherein: the control circuitry is configured to receive a signal indicative of a fluid parameter of the mixed gas upstream of the load, the control circuitry is configured to determine a setpoint for the fluid parameter, and the control circuitry is configured to cause the jet pump to alter the mixing ratio based on a comparison of the signal and the setpoint.

Example 16: The system of example 15, wherein the control circuitry is configured to receive a load signal from the load, wherein the control circuitry is configured to determine the setpoint based on the load signal.

Example 17: The system of example 15 or example 16, wherein the jet pump is configured to alter the mixing ratio based on a control signal received from the control circuitry, wherein the control circuitry is configured to generate the control signal based on the comparison of the signal and the setpoint.

Example 18: The system of any of examples 15-17, further comprising a sensor configured to sense the fluid parameter of the mixed gas upstream of the load, wherein the sensor is configured to communicate the signal to the control circuitry.

Example 19: A method comprising: receiving, by control circuitry, a signal indicative of a fluid parameter of a mixed gas in a distribution system, wherein the mixed gas is generated by a jet pump configured to mix a lower pressure gas and a higher pressure gas to produce the mixed gas; and altering, by the control circuitry, a mixing ratio of the higher pressure gas to the lower pressure gas combined by the jet pump to produce the mixed gas based on the signal received.

Example 20: The method of example 19, further comprising: receiving, by the control circuitry, a load signal from a load configured to receive the mixed gas from the distribution system; determining, by the control circuitry, a setpoint for the fluid parameter; comprising, by the control circuitry, the fluid parameter indicated by the signal with the setpoint; and altering, by the control circuitry, the mixing ratio based on the comparison Various examples have been described. These and other examples are within the scope of the following claims.

What is claimed is:

1. A system comprising:
    a jet pump configured to combine a lower pressure gas and a higher pressure gas to produce a mixed gas, and wherein the jet pump is configured to alter a mixing ratio of the higher pressure gas to the lower pressure gas combined when the jet pump produces the mixed gas, wherein the jet pump is configured to supply the mixed gas to a plurality of gas loads; and
    a control circuitry configured to receive a signal indicative of a fluid parameter of the mixed gas, wherein the control circuitry is configured to:
        receive a plurality of load signals from the plurality of gas loads, wherein a load signal in the plurality of load signals is indicative of an operating status of a gas load in the plurality of gas loads,
        determine a setpoint for the fluid parameter using the operating status indicated by the plurality of load signals,
        compare the fluid parameter indicated by the signal with the setpoint, and
        cause the jet pump to alter the mixing ratio based on the comparison of the fluid parameter and the setpoint.

2. The system of claim 1, wherein the plurality of gas loads comprises one or more of:
    an environmental control system configured to provide air to a cabin and enable a heat transfer between the mixed gas and the air,
    an air drive unit configured to pressurize a hydraulic system using the mixed gas,
    an anti-icing system configured to cause the removal of ice from an aircraft wing,
    a fuel tank system, or
    a pneumatic system configured to receive the mixed gas.

3. The system of claim 1, wherein:
    the jet pump is configured to receive a flow of the higher pressure gas and a flow of the lower pressure gas,
    the jet pump is configured to mix the flow of the higher pressure gas and the flow of lower pressure gas to produce the mixed gas, and
    the jet pump is configured to alter the flow of the higher pressure gas to alter the mixing ratio.

4. The system of claim 1, further comprising a sensor configured to sense the fluid parameter of the mixed gas, wherein the sensor is configured to communicate the signal to the control circuitry.

5. The system of claim 1, wherein the jet pump includes a diffuser configured to expand the mixed gas, and wherein the signal is indicative of a fluid parameter of the expanded mixed gas.

6. The system of claim 1, wherein the jet pump is configured to issue a flow of the mixed gas in an upstream direction to the plurality of gas loads, and wherein the signal is indicative of the fluid parameter of the mixed gas downstream of the plurality of gas loads.

7. The system of claim 1, wherein the jet pump includes a pump body and a variable nozzle, wherein the variable nozzle is configured to translate relative to the pump body to alter the mixing ratio, and wherein the control circuitry is configured to cause the jet pump to alter the mixing ratio by at least translating the variable nozzle relative to the pump body.

8. The system of claim 1, wherein the jet pump is configured to alter the mixing ratio based on a control signal received from the control circuitry, wherein the control circuitry is configured to generate the control signal based on the comparison of the fluid parameter and the setpoint.

9. The system of claim 1, further comprising a device configured to exert a mechanical force on the jet pump to cause the jet pump to alter the mixing ratio, wherein the device is configured to exert the mechanical force on the jet pump in response to a control signal, and wherein the control circuitry is configured to communicate the control signal to the device.

10. The system of claim 9, wherein the device is configured to vary an amount of the mechanical force exerted on the jet pump based on a signal characteristic of the control signal, and wherein the jet pump is configured to establish the mixing ratio based on the amount of the mechanical force.

11. The system of claim 9, wherein:
the device is configured to exert the mechanical force using a control fluid having a pressure,
the device is configured to vary the pressure of the control fluid to vary the amount of the mechanical force, and
the device is configured to establish the pressure of the control fluid based on a value of the control signal.

12. The system of claim 1, wherein the jet pump is configured to receive the lower pressure gas from a lower pressure stage of a turbine engine and receive the higher pressure gas from a higher pressure stage of the turbine engine.

13. The system of claim 12, further comprising the turbine engine,
wherein the turbine engine is configured to increase a pressure of a gas stream as the gas stream flows from an initial compressor stage to a penultimate compressor stage to a final compressor stage,
wherein the penultimate compressor stage is configured to issue the compressed gas to the final compressor stage,
wherein the final compressor stage is configured to issue the compressed gas to a combustion chamber, and
wherein the system is configured to provide the higher pressure gas from the gas stream prior to the gas stream flowing to one of the penultimate compressor stage or the final pressure stage.

14. The system of claim 1, further comprising a supply conduit configured to receive the mixed gas from the jet and provide the mixed gas to the plurality of gas loads, wherein the signal indicative of the fluid parameter of the mixed gas is a signal indicative of the fluid parameter of the mixed gas within the supply conduit.

15. The system of claim 1, wherein the fluid parameter is indicative of a pressure of the mixed gas.

16. The system of claim 1, wherein the fluid parameter is indicative of at least one of a flow rate of the mixed gas or a temperature of the mixed gas.

17. A system, comprising:
a jet pump configured to receive a lower pressure gas from a lower pressure stage of a turbine engine and receive a higher pressure gas from a higher pressure stage of the turbine engine;
wherein the jet pump is configured to combine the lower pressure gas and the higher pressure gas to produce a mixed gas,
wherein the jet pump is configured to alter a mixing ratio of the higher pressure gas to the lower pressure gas combined when the jet pump produces the mixed gas, and
wherein the jet pump is configured to issue a flow of the mixed gas in a downstream direction to a plurality of gas loads, the load configured to receive the mixed gas; and
a control circuitry configured to:
receive a signal indicative of a fluid parameter of the mixed gas upstream of the one or more of the plurality of gas loads,
receive a plurality of load signals from the plurality of gas loads, wherein a load signal in the plurality of load signals is indicative of an operating status of a gas load in the plurality of gas loads,
determine a setpoint for the fluid parameter using the operating status indicated by the plurality of load signals, and
cause the jet pump to alter the mixing ratio based on a comparison of the signal and the setpoint.

18. The system of claim 17, wherein the jet pump is configured to alter the mixing ratio based on a control signal received from the control circuitry, wherein the control circuitry is configured to generate the control signal based on the comparison of the signal and the setpoint.

19. The system of claim 17, further comprising a sensor configured to sense the fluid parameter of the mixed gas upstream of the load, wherein the sensor is configured to communicate the signal to the control circuitry.

20. A method comprising:
receiving, by a control circuitry, a signal indicative of a fluid parameter of a mixed gas in a distribution system, wherein the mixed gas is generated by a jet pump configured to mix a lower pressure gas and a higher pressure gas to produce the mixed gas, and wherein the jet pump is configured to supply the mixed gas to a plurality of gas loads;
receiving, by the control circuitry, a plurality of load signals from the plurality of loads, wherein a load signal in the plurality of load signals is indicative of an operating status of a gas load in the plurality of gas loads;
determining, by the control circuitry, a setpoint for the fluid parameter using the operating status indicated by the plurality of load signals;
comparing, by the control circuitry, the fluid parameter indicated by the signal with the setpoint; and
altering, by the control circuitry, a mixing ratio of the higher pressure gas to the lower pressure gas combined by the jet pump to produce the mixed gas based on the comparison of the fluid parameter and the setpoint.

* * * * *